United States Patent [19]

Höck et al.

[11] 3,882,820
[45] May 13, 1975

[54] COATING APPARATUS

[75] Inventors: Karl Höck; Alfred Nieroba, both of Troisdorf; Karl Heinz Weiper, Schladern, all of Germany

[73] Assignee: Dynamit Nobel Aktiengesellschaft

[22] Filed: Aug. 30, 1973

[21] Appl. No.: 393,195

[30] Foreign Application Priority Data
Aug. 31, 1972 Germany............................ 2242953

[52] U.S. Cl. ................ 118/603; 118/405; 118/429; 198/220 R; 209/1
[51] Int. Cl. ............................................ B05c 11/10
[58] Field of Search ........... 118/308, 312, 404, 405, 118/419, 429, 420, 602, 603; 117/19–21

[56] References Cited
UNITED STATES PATENTS

| | | | |
|---|---|---|---|
| 2,283,621 | 5/1942 | Arber.................................. | 118/405 |
| 2,654,465 | 10/1953 | Sgriccia........................ | 118/425 UX |
| 2,971,242 | 2/1961 | Doleman et al. ............... | 117/DIG. 6 |
| 3,097,958 | 7/1963 | Morris ............................ | 118/312 X |
| 3,479,200 | 11/1969 | Estabrooks ..................... | 117/21 |
| 3,613,159 | 10/1971 | Biegler............................ | 118/405 X |

*Primary Examiner*—Morris Kaplan
*Attorney, Agent, or Firm*—Craig & Antonelli

[57] ABSTRACT

Apparatus and method for simultaneously powdering both sides of film webs. A conveying chute is provided which extends longitudinally with a slight downward inclination in the conveying direction and which is continuously vibrated by a magnetic vibrator. Powder is supplied to this conveying chute continuously so that a continuous layer of approximately 2–4 cm. of powder is provided along the length of the conveyor chute. An elongated slot is provided at the bottom of the conveyor chute and roller guides are arranged respectively above and below the conveyor chute and substantially parallel to the elongated slot for conducting film web material from underneath the conveyor upwardly through the slot and conveyor and then upward and out of the conveyor such that both sides of the film web are powdered by the vibrating powder layer extending at both sides of the slot and, consequently at both sides of the film web. A vibrating return chute is provided underneath the conveyor chute for returning excess powder from the outlet end of the conveyor chute back to an elevating screw-type plate conveyor which conveys the powder back to the inlet of the conveying chute. A jolting screen is provided at the outlet of the return chute for separating large unusable particles of powder which are then returned to a comminuting device preliminary to being introduced back into the system.

27 Claims, 9 Drawing Figures

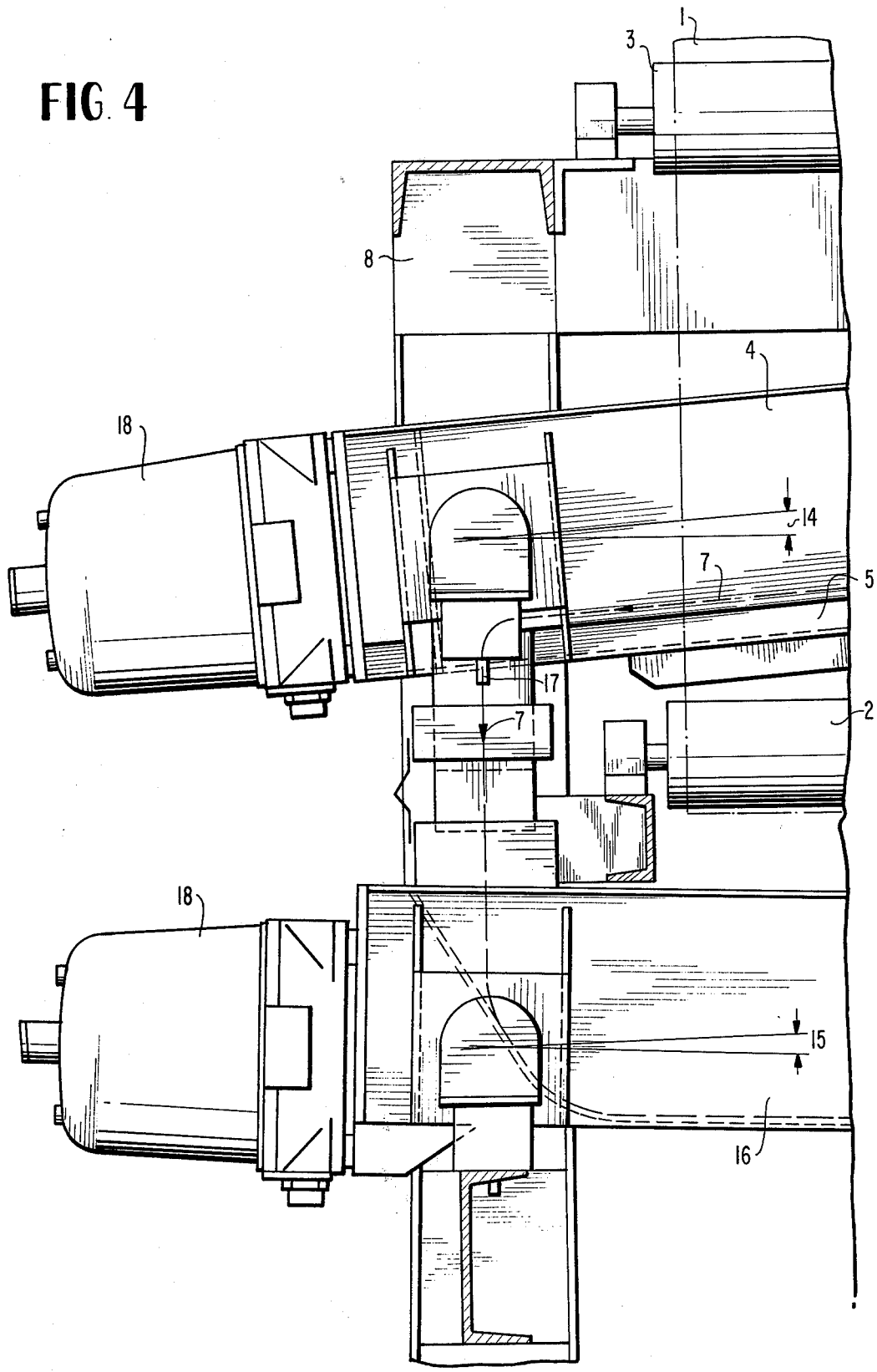

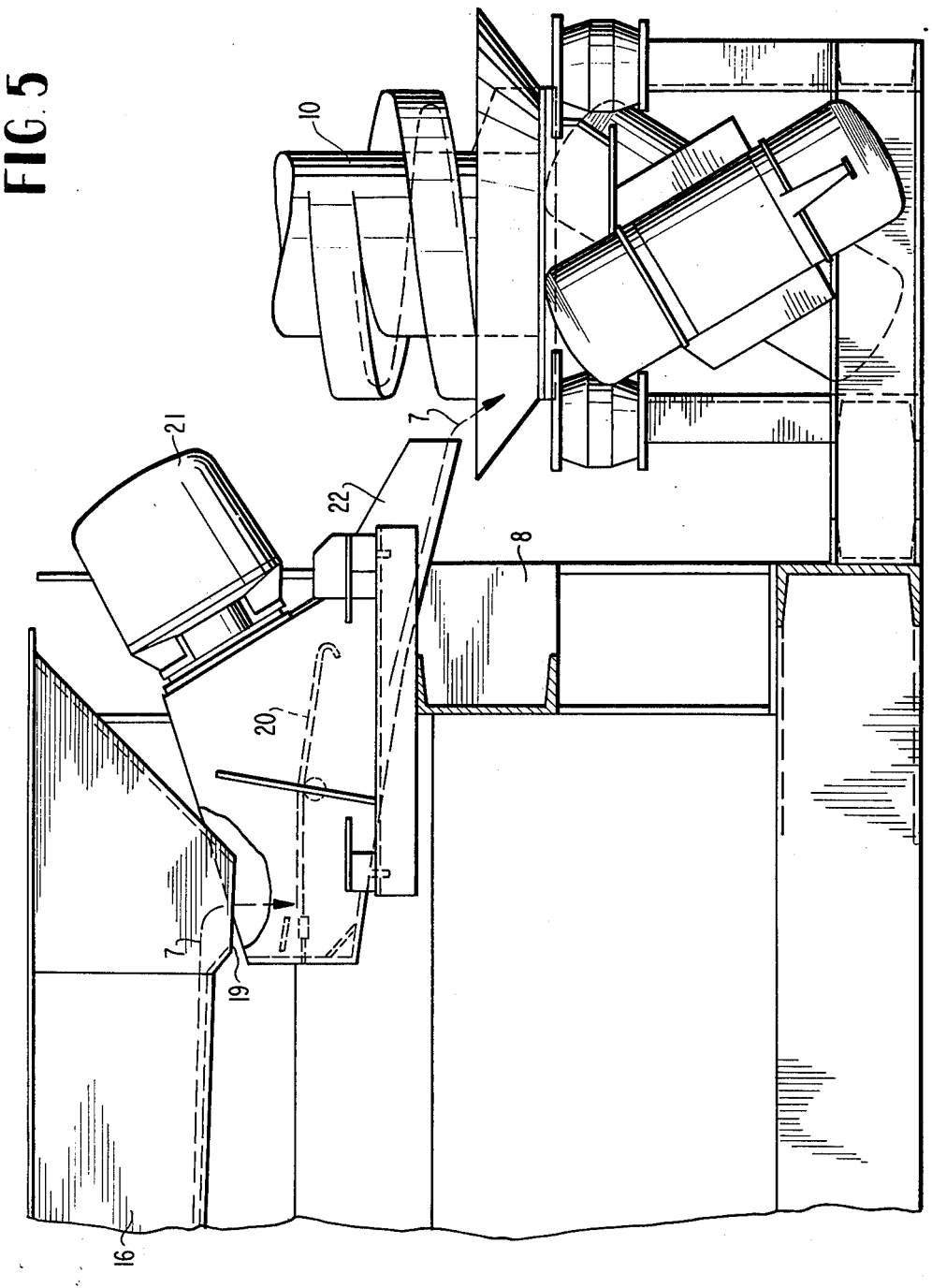

COATING APPARATUS

BACKGROUND AND SUMMARY OF THE INVENTION

The present invention relates to an apparatus for powdering film webs on both sides, which is necessary, for example, in case of slightly tacky films in order to avoid blocking of the rolled-up film webs. Pulverized bicarbonate is employed, for example, for powdering thermoplastic film sheets. Such film webs may be polyvinylbutyral foils for use in compound glasses in construction or safety glass for automobiles. The powdering usually takes place at room temperature and is for the purpose of facilitating transportation in rolls, with the powder being usually washed away for final use of the foils. The powder may be pulverized bicarbonate or natron powder.

It has been contemplated to powder film webs unilaterally (on one side) by a roller method. However, this one-sided powdering procedure is not sufficient in all cases. Furthermore, electrostatic powdering devices have also been contemplated. However, when these electrostatic devices are filled, for example, with bicarbonate as the powder, these devices emit an enormous amount of dust and can therefore only be operated while wearing a gas mask.

This invention contemplates providing powdering apparatus for film webs or sheeting which makes it possible to power both sides without dust formation in one operating step.

The apparatus of a preferred embodiment of the present invention is characterized in that the film web is guided in the vertical direction from the bottom toward the top through an elongated slot of a conveying chute or trough filled partially with powder and maintained in motion by means of a vibrator, wherein the conveying chute is disposed to be slightly inclined at right angles to the traveling direction of the film web. It is possible with this preferred embodiment of this invention to powder the film web simultaneously on both sides uniformly and fully automatically, the apparatus operating with a minimum generation of dust. In this arrangement, the combination of the features of the vibrating chute with the inclined position proves to be especially advantageous, making it possible for the powder to flow automatically and thus to sweep over the pulled-through film web and spread itself thereon.

Depending on the thickness of the film and also on the width of the film web, a further development of the apparatus of this invention comprises to make the elongated slot adjustable in breadth as well as in length. This adjustability of the slot can be effected, for example, by means of slides.

In order to ensure the fully automatic operation of the powdering apparatus and simultaneously to avoid unnecessary waste of unconsumed powder the present invention further contemplates providing a return chute, preferably disposed underneath the conveying chute, into which the excess powder is conducted at the end of the conveying chute. This return chute is arranged preferably to be inclined in opposition to the conveying chute, so that a compact arrangement can be achieved. This return chute is also suitably connected to a vibrating mechanism, for example a magnetic vibrator, so that a uniform continued flow of the residual powder is made possible. At the end of the return chute, the powder can fall into a gravity screen provided underneath the return chute. This screen, constructed preferably as a jolting or vibrating screen, sorts out powder particles which are too large and agglomerated, and these particles are fed to a comminuting device. The powder which has passed through the screen is recycled to the inlet of the conveying chute by means of a recycling device, preferably a reciprocating plate screw-type conveyor.

The apparatus of this invention for the bilateral powdering of a film web not only makes it possible to powder film webs economically, but also has the essential advantage that the bilateral, dust-free powdering operation can be effected without an additional stretching of the film.

These and further objects, features and advantages of the present invention will become more obvious from the following description when taken in connection with the accompanying drawings, which show, for purposes of illustration only, a single embodiment in accordance with the present invention.

BRIEF DESCRIPTION OF THE DRAWINGS

FIG. 4 is a schematic partial view of the apparatus of FIG. 1 which shows the powder transfer between conveying and return vibrating devices;

FIG. 5 is a detailed view of the powder recycling system of the apparatus of FIG. 1.

DETAILED DESCRIPTION OF THE DRAWINGS

Figure 1:
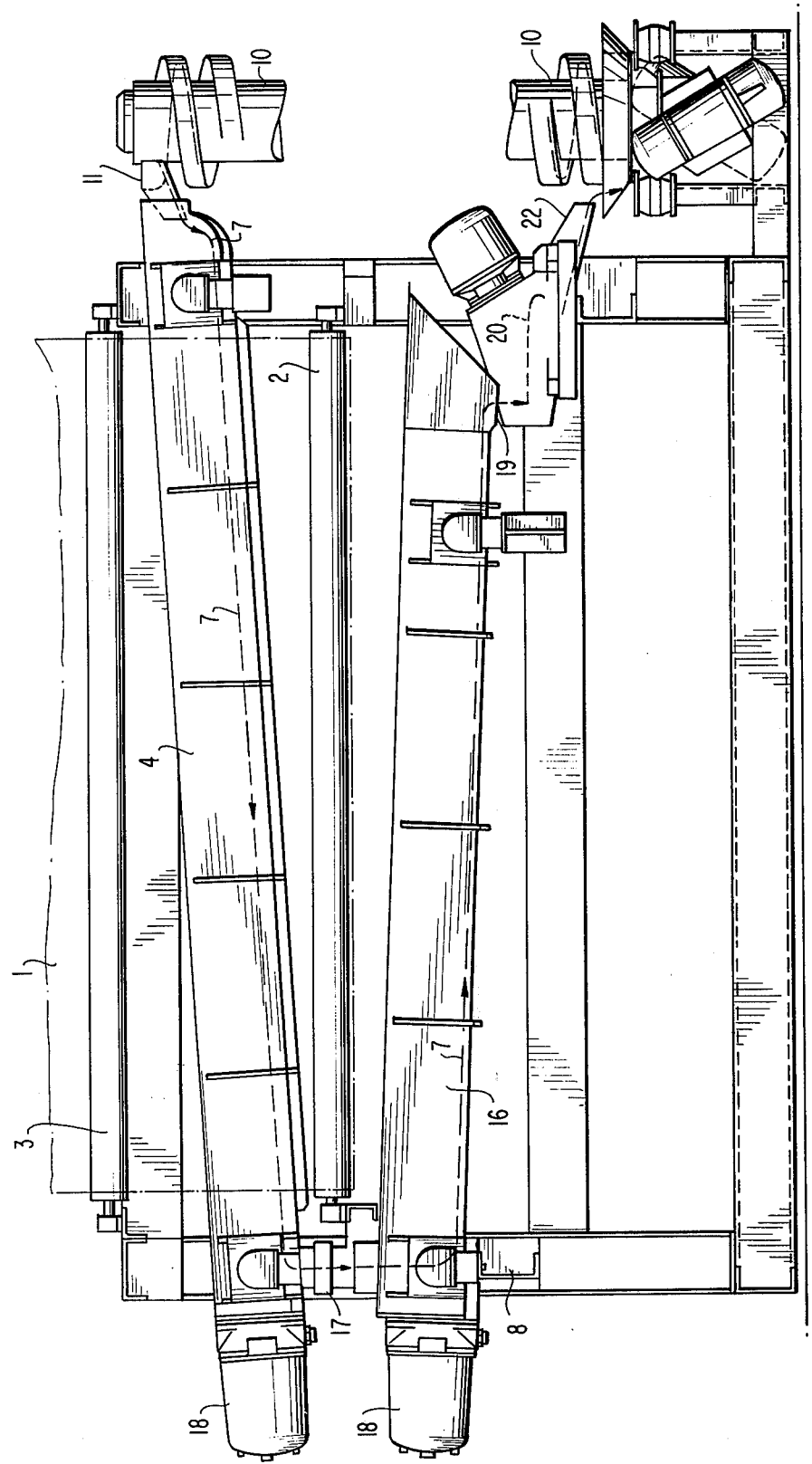
FIG. 1 is a schematic side view of an apparatus for powdering film webs in accordance with the present invention.

FIG. 1 illustrates apparatus arranged in accordance with a preferred embodiment of this invention for the bilateral powdering of film webs in a vertical arrangement. The film web 1 is introduced in a horizontal direction between two vertically superimposed chutes, namely conveying chute 4 and return chute 16 for the powder 7. Film web 1 travels over guide roll 2 and is guided vertically in the upward direction through the conveying chute 4 via the guide rolls 2 and 3. The two chutes 4, 16 are disposed to be slightly inclined toward each other, so that the powder flow from the inlet 11 of the conveying chute 4 to the outlet 17 and in the return chute 16 toward the discharge opening 19 thereof is more advantageously ensured. The chutes 4, 16, as well as the guide rolls 2, 3 for the film web 1 are supported and/or mounted at the supporting frame 8. The chutes 4, 16 are each connected to a magnetic vibrator 18. A jolting or vibrating screen 20 adjoins the discharge end of the return chute 16. From this screen 20, the residual powder is conveyed to a return device constructed as a reciprocating plate screw-type feeder 10, from which the residual powder is, in turn, fed to the inlet 11 of the conveying chute 4.

In the following FIGS. 2–6, details of the powdering apparatus schematically illustrated in FIG. 1 are illustrated in greater depth.

Figure 2A:
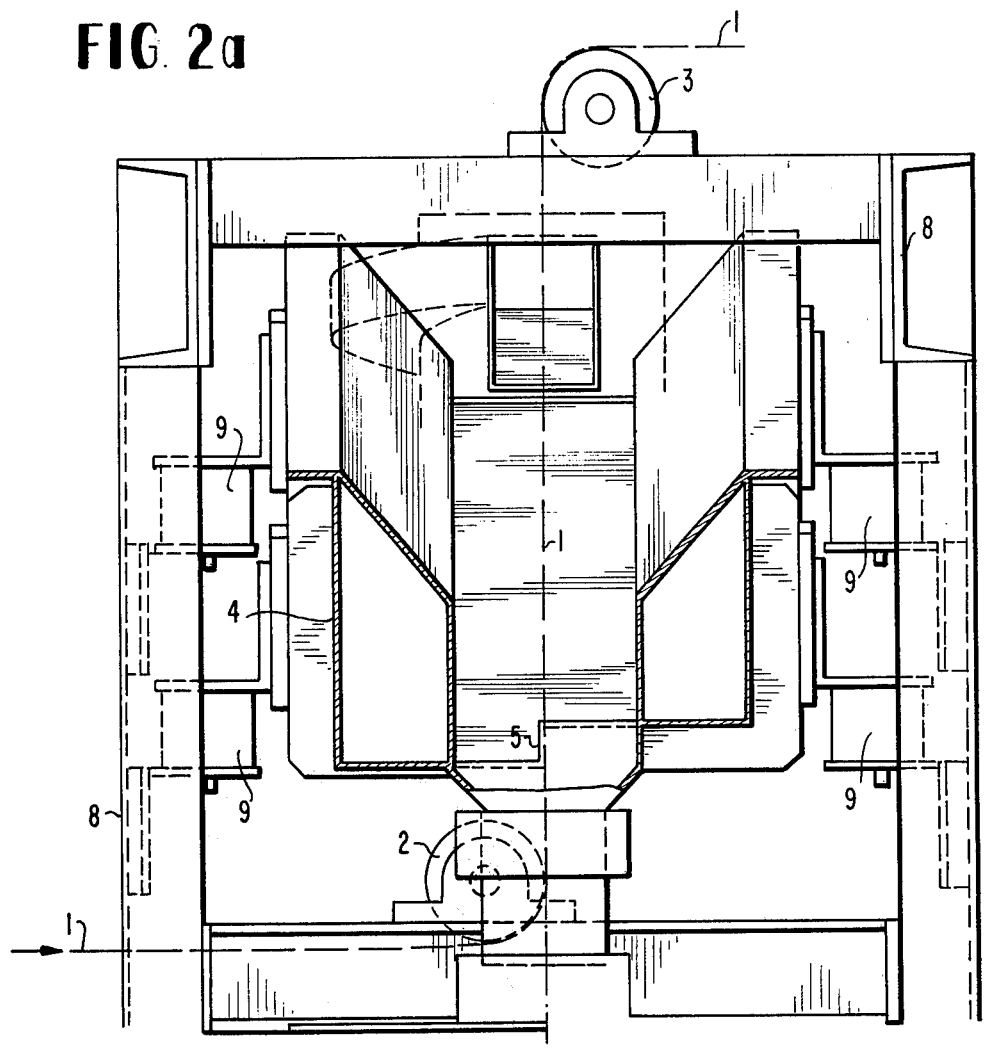
FIG. 2a is a schematic cross-sectional view through the conveying chute of the apparatus of FIG. 1.

In FIG. 2a, the conveying chute 4 for the powder 7 is shown in a cross-sectional view. The conveying chute 4 is attached to the supporting frame 8 via the rubber buffers 9, so that the vibration produced by the magnetic vibrators can be absorbed. The film web 1 is laterally fed underneath the conveying chute 4 and deflected by means of the guide roll 2 into the vertical direction and guided through the elongated slot 5 through the chute 4, whereupon the web 1 is withdrawn via the guide roll 3 disposed above the conveying chute 4. The powder 7, for example bicarbonate, passes through the conveying chute 4 suitably at a level of the powder material of 2–4 cm. and covers the traveling film web 1 simultaneously on both sides.

In this type of powdering operation, an additional stretching of the film web, which is often undesirable, is avoided. At the same time, the powdering step takes place without any large dust generation, so that no additional dust-removal measures need be taken for the surroundings.

Figure 2B:
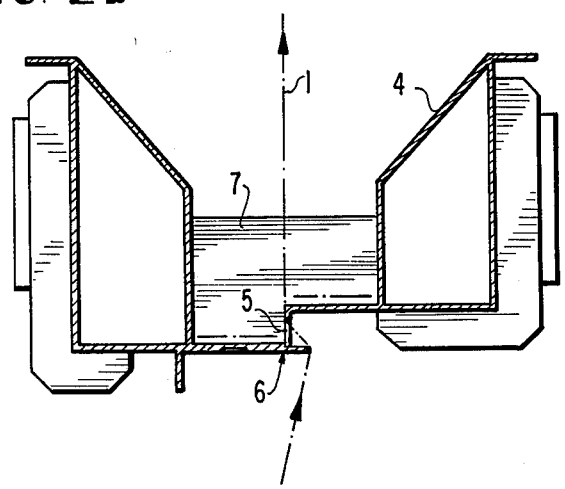
FIG. 2b is a schematic cross-sectional view showing details of the conveying chute of the apparatus of FIG. 1.

In FIG. 2b, the conveying chute is once again shown in detail in a cross-section, wherein the elongated slot 5 is clearly visible in the lower zone of the conveying chute, through which the film web 1 is pulled. The gap width of the longitudinal slot 5 can be varied by means of the slide 6. The powder 7 travels within the conveying chute 4 at the above-stated preferred depth of 2–4 cm.

Figure 3:
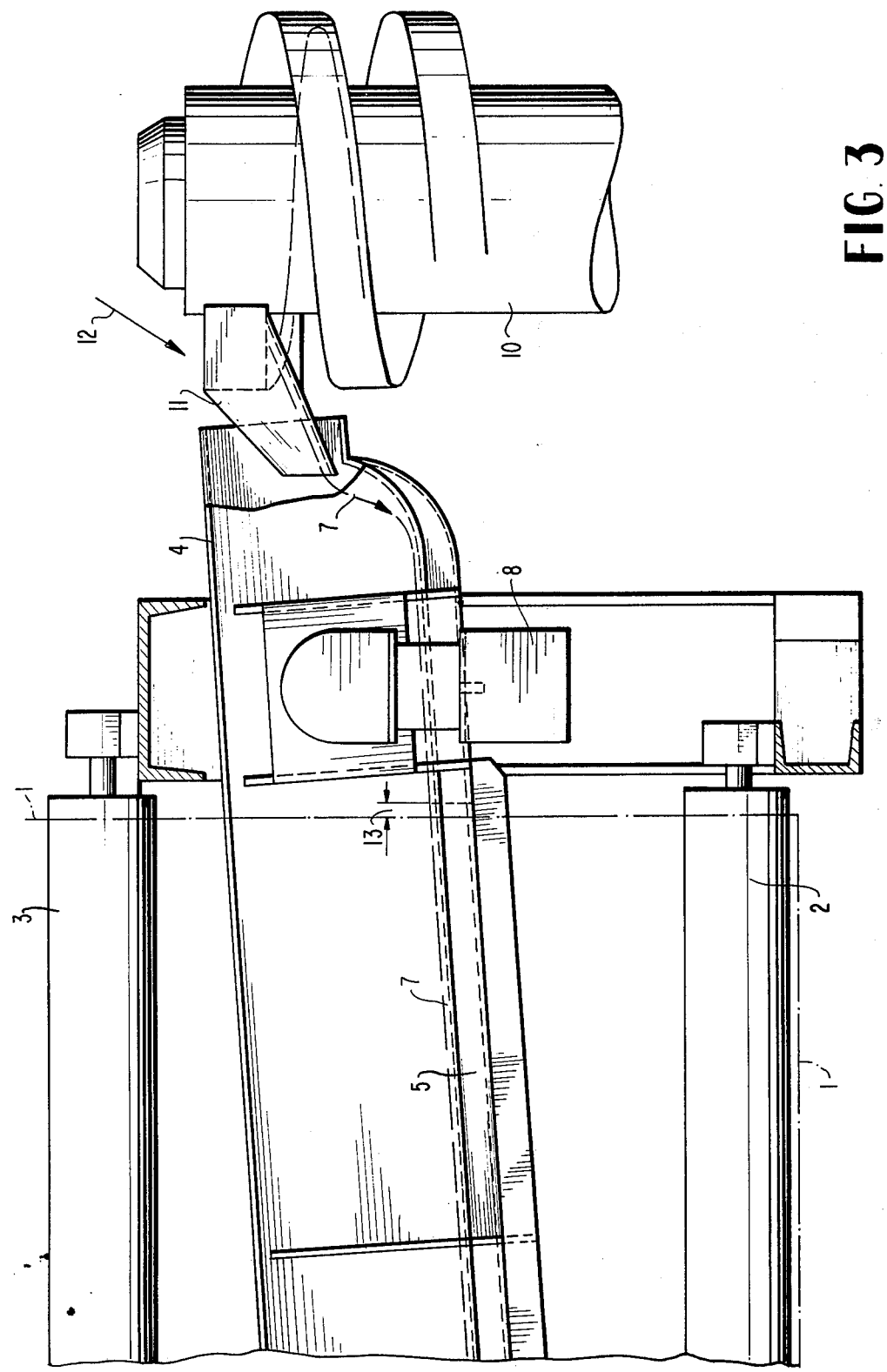
FIG. 3 is a schematic view which shows a detail of the powder inlet into the conveying chute of the apparatus of FIG. 1.

FIG. 3 illustrates in more detail the feeding of the powder 7 to the conveyor chute 4 at the inlet end 11 thereof. The conveyor chute 4 is slightly downwardly inclined in the flow direction and extends approximately at right angles to the traveling direction of the film web 1, in order to facilitate the flow and the passage therethrough of the film web 1. An angle of inclination of about 4° is sufficient. The feeding of the powder takes place, for example, via the reciprocating plate screwtype conveyor 10 which conveys the residual powder from the return chute back into the conveying chute; a metering device 12, not shown in detail herein, is also associated with the conveyor for replenishing the consumed powder.

FIG. 4 shows the outlet end of the conveying chute 4 with the outlet opening 17 in the lower zone of the conveying chute, from which the excess powder 7 falls down and runs into the return chute 16 disposed therebelow. The two chutes 4 and 16 are each disposed to be slightly inclined, wherein the angles of inclination 14 and 15 are oriented toward each other, so that each chute is slightly inclined in the flow direction of the powder. At one end of the conveying chute 4 and the return chute 16, respectively one magnetic vibrator 18 is attached, ensuring a constant slight vibration of the chutes, so that the uniform flowing of the powder is achieved.

At the outlet end of the return chute 16, a discharge opening 19 is provided, through which the residual powder 7 falls onto the jolting or vibrating screen 20 disposed therebeneath. This screen 20 is kept in motion by means of vibrator 21 (see FIG. 5). The jolting screen 20 serves for sorting out the larger and/or agglomerated powder particles which are conveyed to a crushing or comminuting device, not shown, from which they are recycled into the powdering plant, for example, by way of metering device 12. The fine residual powder 7 falling through the jolting screen then enters, via discharge 22, the reciprocating plate conveyor 10, from which the powder 7 is fed to the conveying chute 4 arranged thereabove.

Figure 6A:
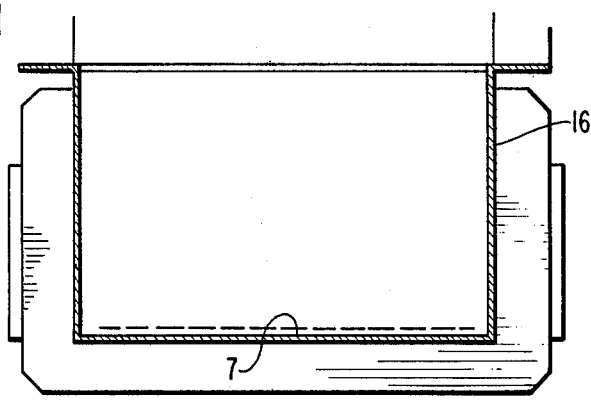
FIGS. 6a, 6b, and 6c are different views showing details of the return chute of the apparatus of FIG. 1.
Figure 6B:
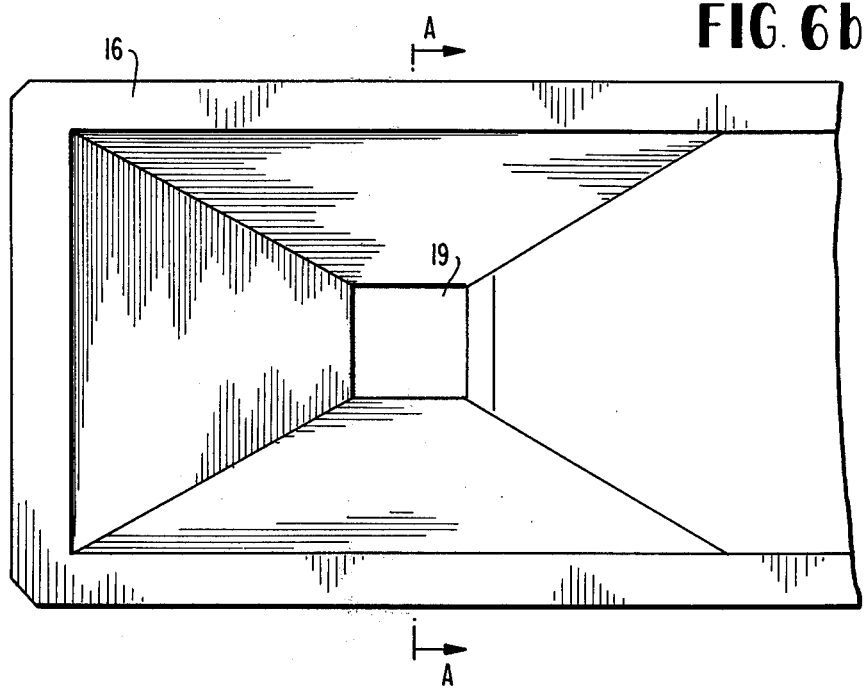
Figure 6C:
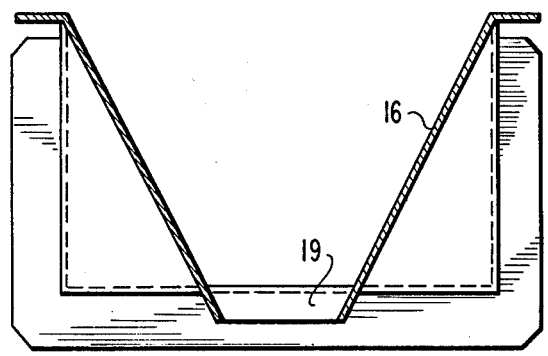

FIGS. 6a, 6b, and 6c show various cross-sections of the return chute 16, which, in its central and initial zones, preferably has a rectangular cross-section. The chute 16 toward its outlet end is shaped like a funnel toward the opening 19, as can be derived from the top view of FIG. 6b and the cross-section A—A of FIG. 6b, shown in FIG. 6c.

In case of widths of the film web which are smaller than in the illustrated example, it is contemplated by the invention to arrange underneath the conveying chute 4 laterally elongated slides for closing the slot; these slides being placed toward a closing position in case of smaller film widths, to avoid any unnecessary escape of powder. It is also contemplated by this invention to provide a return chute in a different association with the conveying chute, not deviating from the essential ideas of this invention for the bilateral, simultaneous and uniform, dust-free powdering of the film web by means of the conveying chute.

The breadth of elongated slot 5 is designed and or controlled such that it is very slightly broader than the thickness of the film web so as to limit or preclude powder dropping therethrough. Any powder falling through slot 5 is captured by the return chute. The space or crack between the end of slot 5 and the edge of the film web is designated as 13 in FIG. 3.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Apparatus for the bilateral powdering of a film web comprising:
   a conveying chute,
   powder supplying means for supplying powder to said conveying chute,
   conveying chute vibrator means for vibrating said conveying chute such that said powder travels along the length of the conveying chute in a conveying direction,
   an elongated slot formed in the bottom of said conveying chute,
   and film web conducting means for conducting a film web through said slot in an upward direction and upwardly through said conveying chute such that said film web is contacted on both sides thereof by the powder in said conveying chute as it passes through said conveying chute.

2. Apparatus according to claim 1, wherein said conveying chute is inclined downwardly at a slight angle to the horizontal in the conveying direction.

3. Apparatus according to claim 2, wherein said slight angle is approximately 4°.

4. Apparatus according to claim 1, wherein said powder supplying means and conveying chute vibrator means are constructed such that a continuous level of approximately 2-4 cm of powder along the length of the conveyor chute is maintained.

5. Apparatus according to claim 1, wherein slot width adjusting means are provided for adjusting the width of the elongated slot to accommodate different thickness film webs.

6. Apparatus according to claim 1, wherein slot length adjusting means are provided for adjusting the length of the elongated slot in the conveying direction to accommodate different width film webs.

7. Apparatus according to claim 5, wherein slot length adjusting means are provided for adjusting the length of the elongated slot in the conveying direction to accommodate different width film webs.

8. Apparatus according to claim 7, wherein said conveying chute is inclined downwardly at a slight angle to the horizontal in the conveying direction.

9. Apparatus according to claim 8, wherein said powder supplying means and conveying chute vibrator means are constructed such that a continuous level of approximately 2-4 cm of powder along the length of the conveyor chute is maintained.

10. Apparatus according to claim 1, further comprising a return chute and excess powder return means for transferring excess powder from the end of the conveying chute to the return chute.

11. Apparatus according to claim 10, wherein said return chute is positioned below said conveying chute.

12. Apparatus according to claim 11, wherein said return chute is inclined downwardly at a slight angle to the horizontal in a direction opposite the conveying direction of said conveying chute.

13. Apparatus according to claim 12, wherein said conveying chute is inclined downwardly at a slight angle to the horizontal in the conveying direction.

14. Apparatus according to claim 13, wherein the respective slight angles of inclinations of both said conveying chute and said return chute are approximately 4°.

15. Apparatus according to claim 10, further comprising return chute vibrator means for vibrating said return chute such that said excess powder travels along the length of the return chute in a return direction.

16. Apparatus according to claim 15, wherein said return chute terminates adjacent an inlet end of said conveying chute, and wherein said powder supplying means includes elevator means for transferring powder from the return chute to the conveying chute.

17. Apparatus according to claim 15, wherein each of said conveying chute vibrator means and said return chute vibrator means are magnetic vibrators.

18. Apparatus according to claim 17, further comprising resilient support means for each of said conveying chute and return chute.

19. Apparatus according to claim 10, wherein a vibratable gravity screen is disposed at an outlet end of the return chute for separating small usable particles of said powder from unusable large particles.

20. Apparatus according to claim 19, wherein reciprocating plate screw-type conveyor means are arranged downstream of said gravity screen for returning said usable small particles to an inlet end of said conveyor chute.

21. Apparatus according to claim 16, wherein said elevator means is a reciprocating plate vertically extending reciprocating plate screw-type conveyor means.

22. Apparatus according to claim 1, wherein said film web conducting means includes a bottom roller extending below and approximately parallel to said elongated slot and a top roller extending above said conveying chute parallel to said bottom roller.

23. Apparatus according to claim 22, wherein said film web conducting means further includes means for guiding said film web in a horizontal direction to said bottom roller and from said top roller.

24. Apparatus according to claim 19, wherein said film web conducting means includes a bottom roller extending below and approximately parallel to said elongated slot and a top roller extending above said conveying chute parallel to said bottom roller.

25. Apparatus according to claim 24, wherein said film web conducting means further includes means for guiding said film web in a horizontal direction to said bottom roller and from said top roller.

26. Apparatus according to claim 1, wherein said powder supplying means includes means for supplying pulverized bicarbonate as said powder.

27. Apparatus according to claim 26, wherein said film web is in the form of a thermoplastic film sheet.

* * * * *